Aug. 5, 1969 W. H. WATTENBURG 3,460,121

SIGNALLING AND COMMUNICATION SYSTEM

Filed Oct. 24, 1965 3 Sheets-Sheet 1

INVENTOR.
WILLARD H. WATTENBURG

BY

ATTORNEYS

INVENTOR.
WILLARD H.
WATTENBURG

BY

Flehr and Swain
ATTORNEYS

SIGNALLING AND COMMUNICATION SYSTEM

Filed Oct. 24, 1965

United States Patent Office 3,460,121
Patented Aug. 5, 1969

3,460,121

SIGNALLING AND COMMUNICATION SYSTEM

Willard H. Wattenburg, Berkeley, Calif., assignor, by mesne assignments, to Berkeley Scientific Laboratories, a corporation of California Filed Oct. 24, 1965, Ser. No. 504,918
Int. Cl. G08b *17/06, 25/00*
U.S. Cl. 340—216 3 Claims

ABSTRACT OF THE DISCLOSURE

A signalling system including a sensing device such as a smoke detector or fire alarm which supplies an actuating signal to a transmitter which causes a dynamic load to be connected to the transmission lines causing a doubly modulated signal to appear thereon. The signal consists of a communicating frequency modulated by a pattern harmonically related to the power line frequency. A receiver is coupled to the transmission lines and includes a double detector for detecting the communicating frequency and providing an output signal when the periodic pattern on the communicating frequency is present. Specific circuitry is disclosed for the transmitter and receiver.

This invention relates generally to signalling and communication systems and more particularly to signalling and communication systems for use with active power transmission lines operating in normal usage.

One type of system for signalling along power lines includes an active signal generator, for example, an oscillator, plus line drivers which apply the generated signal to the lines. The signal applied to the line is then detected by a suitable receiver located at some point along the line. Generally, for reliable communication, the signal generator impedence must be appropriately matched to the line to provide optimum power transfer. This requires transformers and the signalling combination becomes relatively expensive. Furthermore, each signalling unit must be matched to its particular power system. Thus, each unit must be adjusted as it is placed in a new power distribution system to obtain maximum power transfer. In many applications, for example, in home fire alarm systems, this makes the system uneconomic.

Another type of signalling system applies a carrier signal to the active power line. The carrier is then modulated at the various stations. Remote receivers receive the modulated carrier and demodulate the same to provide the useful output information. Such systems are relatively complex and expensive.

A central problem in all such normal signalling systems is that the signal power decreases (attenuates) as it travels from the generator to the receiver and/or is degraded in quality by noise and interference on the power line. Furthermore, a conventional oscillator, in a line drive system capable of producing strong signals in a typical active power distribution system, such as is found in homes and industrial buildings, is expensive to build because of the impedance characteristics of such power circuits. Standard frequency sensitive signal receivers are unreliable because of the high noise level on the power lines.

Normal communication systems such as those decribed above generate and detect signals on power lines which are independent of the electrical power, voltage, current and frequency produced by the main power source. They would normally perform better without the main power source connected to the power line since there would be less noise and interference. If they use line power at all, it is only used to supply local power to the electronics of the transmitting and receiving units which could equally well be supplied by independent power supplies such as batteries. In other words, the present and existing signalling systems do not force the main line power source to supply signal power which is guaranteed to be present at the receiver unit.

It is a general object of the present invention to provide an improved signalling and communication system for use with active power lines.

It is another object of the present invention to provide a signalling and communication system for use with power lines which modulate the power line current to provide a unique signal which can be easily and readily detected and separated from noise and interference on the power line.

It is another object of the present invention to provide a signalling and communication system in which the signalling unit absorbs energy from the power line rather than supplying energy thereto.

It is another object of the present invention to provide a signalling unit which includes a dynamic load to create a signal on the active power line.

It is still another object of the present invention to provide a signalling and communication system in which a dynamic load uniquely modulates the line power waveform to produce a signal waveform which can be easily distinguished and detected from the wide range of high frequencies present in the noise present on typical power lines.

It is another object of the present invention to provide a signalling and communication system in which the signalling units operate almost independently of the characteristic impedance of the lines on which they are installed; that is, the signalling units can be characterized as ideal current sumps.

It is a further object of the present invention to provide a signalling and communication system which is small, reliable in operation and inexpensive.

It is a further object of the present invention to provide a signalling and communication system which is flexible and adaptable for a wide variety of applications and whose operation is not critically dependent on the varying characteristic impedances of typical power transmission lines.

It is another object of the present invention to provide a signalling unit for a system of the type described which supplies relatively high signal power while having a small power demand.

It is a further object of the invention to provide a signalling unit for systems of the type described which operates relatively independent of power line characteristics and which requires negligible installation and adjustment costs while suitable for a wide variety of structures and circuits.

It is a further object of the present invention to provide a receiver for reliably receiving signals of the type encountered in signalling by absorption of power from active transmission lines.

The foregoing and other objects of the invention will become more clearly apparent from the following description when taken in conjunction with the accompanying drawings.

Referring to the drawings:

FIGURE 1 schematically illustrates a signalling system in accordance with the invention as applied to an active power circuit;

Figure 1:
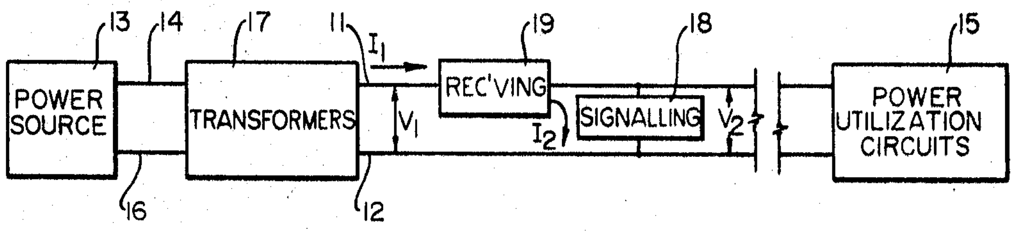

Referring to FIGURE 1, there is schematically illustrated a signalling system in accordance with the invention incorporated in a typical power transmission circuit. Active power lines 11 and 12 receive power from a suitable power source such as a steam or atomic generating station 13, through suitable transmission lines 14 and 16, and one or more distribution transformers 17. The active power lines supply power to industrial, domestic or other users 15.

The communication system of the present invention comprises one or more signalling units 18 and one or more receiving units 19. The signalling unit 18 may be located at the outlet sockets in a home, building, etc., or otherwise connected to the power lines to receive power therefrom. The receiving unit 19 is preferably located between the signalling unit and the power source, as will be presently described.

Transmission lines 11 and 12 may, for example, be 60 cycle 110 volt lines, 50 cycle 220 volt lines; one of the line pairs of any multi-phase, multi-line power transmission system or circuit; a DC power transmission line or circuit; or any other active power transmission circuit.

The signalling unit 18, which will be presently described in detail, causes a load current $I_2$ to be supplied by the power system whenever it is activated. The signalling unit is basically a dynamic load which is electronically switched on and off whenever the signalling unit is activated at a rate determined by an internal control circuit. As will be presently apparent, the amount of power consumed by the signalling unit is small compared to that on the power lines 11 and 12, and the unit does not significantly reduce the line voltage.

The receiving unit detects the presence of the signalling currents $I_1$ produced on the transmission lines by one or more signalling units connected thereto.

It is emphasized that the signalling unit is not a power generator but a power sump or load. The signal power flow is from the power source 13, through the various transformers and substations 17, to the signalling unit 18. Hence, the signal power is greater at the receiving unit 19 than at the signalling unit 18 which causes it to occur whenever there is attenuation in the transmission line between them. For instance, in the power lines 11 and 12 shown in FIGURE 1, the current $I_1$ produced by the power source is greater than I at the receiving unit 19 which is, in turn, greater than $I_2$ drawn from the line by the signalling unit for any real transmission line with losses.

The communication system described exploits the fact that the power transmission line is connected to an active power source which may supply the power demanded by a load placed across the line by the signal unit. The resulting information signal has attenuation characteristics along the line which are inverted compared to those produced by normal signalling systems which use normal signal generators to inject signals onto the line and which use the power line only as a transmission line for the independent signals which they generate. In other words, the prior art signalling systems do not force the power source to supply signal power to the signalling unit which is guaranteed to be present at the receiving unit since the receiving unit is connected therebetween. This is true of the present system as long as the receiver unit is between the signalling unit and the line power source, i.e., the receiver is upstream (in the direction of power flow) from the signalling unit.

It is, of course, to be understood that the signals generated by this technique (power consumption) can be detected elsewhere in the power system just as those which are generated by standard signal generators. In this case, the signals will suffer the same attenuation as those generated by other active means.

The signalling unit comprises a non-linear load which is controlled by signalling electronics. The signalling unit to be presently described may be temporarily or permanently plugged into any conventional power outlet, light socket, or connected across the power circuit at any location within a structure with no other line-coupling or isolation components required. The two-terminal input to the unit can be connected to any sensing device such as a heat sensitive switch, a thermistor, burglar alarm, infrared sensors, smoke detectors, photosensitive elements, movement sensitive elements, etc., or any device capable of shorting or open circuiting the input terminals of the signalling unit or supply electrical power thereto to activate the unit. The unit shown in FIGURE 2 is designed to be activated by the closing or shorting of lines.

Figure 5:
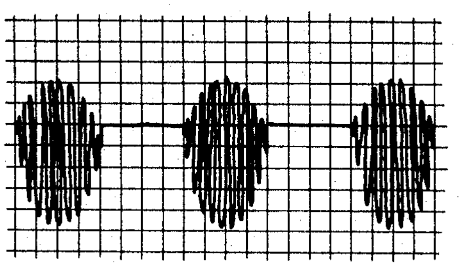
FIGURE 5 shows the current waveform along the line supplying power to the signalling unit.
Figure 6:
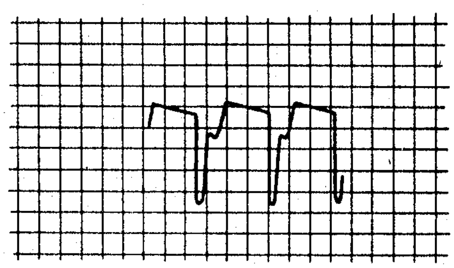
FIGURE 6 is an expanded view of the current waveform.

When the signalling unit is activated, by any of the means described above, it connects a nonlinear load to the lines 11 and 12 and draws a nonlinear line current. The unit is preferably arranged to draw current only during every alternate half cycle of the line voltage. The waveform of the current drawn by such a signalling unit is shown in FIGURES 5 and 6.

The fact that the current is drawn only every alternate half cycle of the line voltage waveform is used by the receiving unit to reliably detect the signals and reject noise signals. The receiving unit demands that an acceptable information signal have the on-off characteristics described above. Hence, any kind of continuous or random signal, such as a signal generated by wireless intercoms, radio transmitters and other continuous or random noise generating element, can be rejected by the receiving unit and the signal produced by the signalling unit can be reliably detected.

Figures 2, 9:
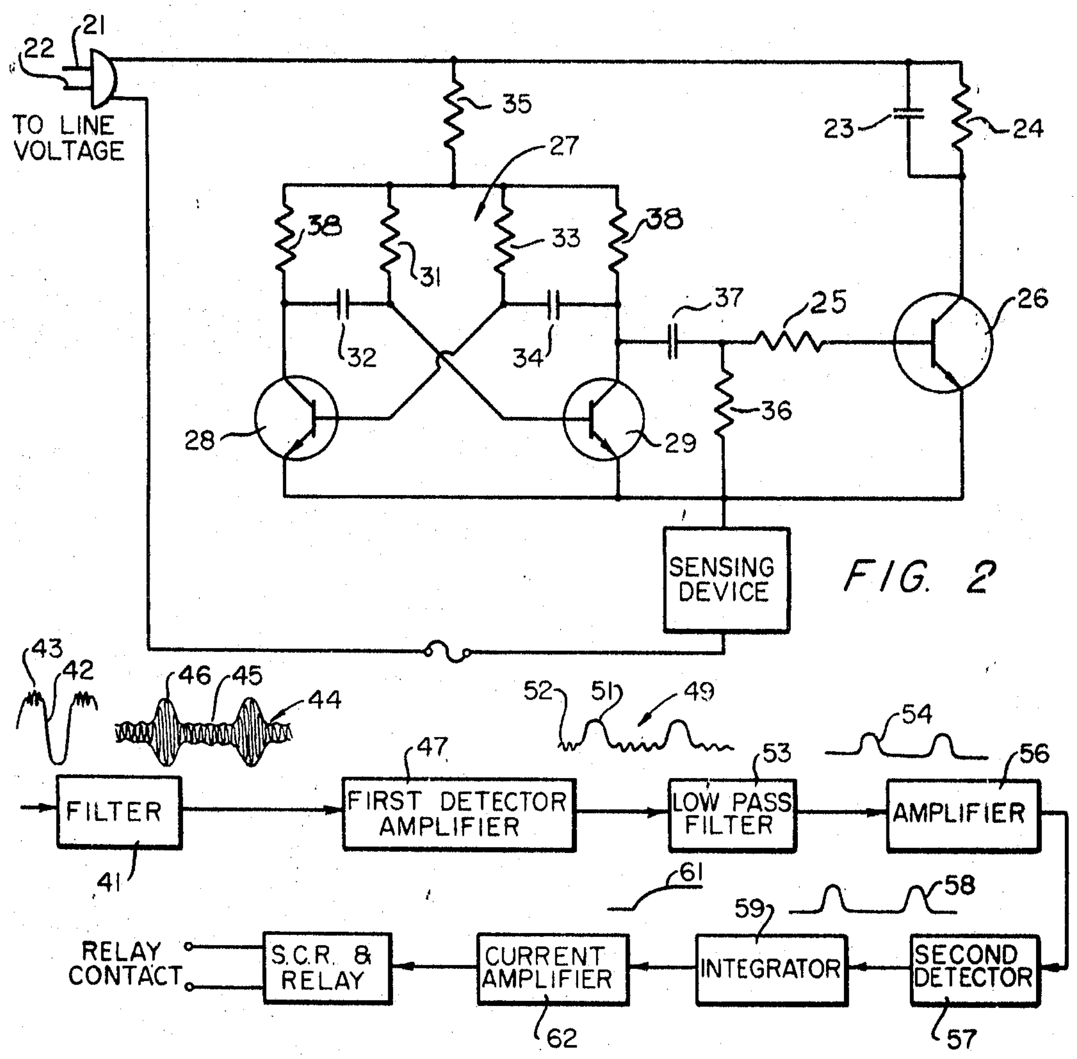
FIGURE 2 is a schematic circuit diagram of a typical dynamic signalling unit for use in conjunction with the system of the present invention.
FIGURE 9 is a block diagram schematically illustrating a receiving unit for use in conjunction with the signalling system of the present invention.

Referring to FIGURE 2, there is shown a complete circuit diagram of a suitable signalling unit for applying a dynamic load to the active power lines in accordance with the present invention.

The signalling unit is connected across the active lines 11 and 12 at the terminals 21 and 22. A nonlinear load connected across the line comprises the combination of capacitor 23 and resistor 24 connected in series with a switching transistor 26 which selectively connects the load across the line. The switching transistor in the example shown is operated by a free-running multivibrator circuit 27 including transistors 28 and 29 and associated circuit components. The oscillating frequency of the multivibrator is determined by the resistive-capacitive networks 31, 32 and 33, 34. The resistor 35 acts as a series voltage dropping resistor so that the emitter-collector voltage of the transistors 28 and 29 will not exceed their rated values.

Resistor 36 and coupling capacitor 37 couple the multivibrator to power switching transistor 26. The multivibrator swings the voltage of the base of the power transistor 26 positive and negative with respect to its emitter. The power transistor is operated either at a cut-off or saturation. Consequently, the power dissipation in the transistor is maintained at a minimum.

Figure 3:
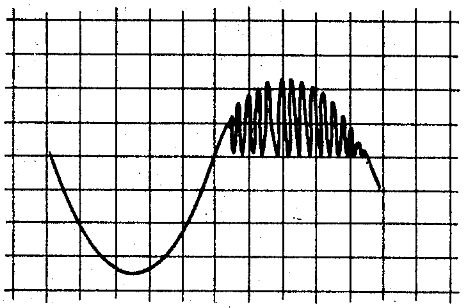
FIGURE 3 shows the voltage waveform at the output transistor of the signalling unit.
Figure 4:
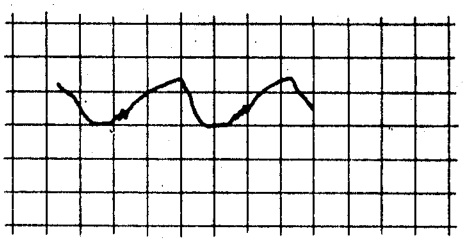
FIGURE 4 is an expanded view of several cycles of the voltage shown in FIGURE 3.
Figure 7:
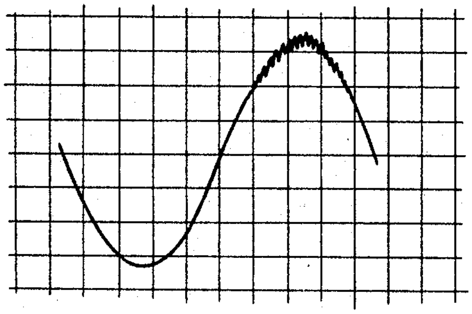
FIGURE 7 shows the voltage across the line applying power to the power unit.
Figure 8:
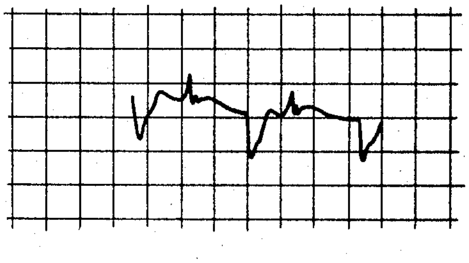
FIGURE 8 is an enlarged view of a few cycles of the voltage waveform.

Although the base current of the transistor 26 attempts to draw a squarewave current through its collector, the existence of the capacitor 23 in parallel with the resistor 24 and the finite rise time of the transistor and the line impedance will produce a current waveform of the type shown in FIGURES 5 and 6 and a collector voltage waveform such as that shown in FIGURES 3 and 4. The voltage appearing across the signalling unit lines 21 and 22 is shown in FIGURES 7 and 8. It is noted that the voltage variations are in the order of 10 percent of the line voltage and that they occur every other or alternate half cycle of line voltage.

FIGURE 9 is a block diagram of a suitable receiving unit. The receiving unit includes a high pass or bandpass filter 41 which serves to receive the input current 42 and pass only the current component 43 having the signalling unit frequency and noise having a frequency within this band to give an output such as shown at 44, with the central portion 45 representing noise and the peaks 46 representing the signal waveform introduced by the signalling unit as it periodically draws power from the line at this frequency. This high frequency signal is then detected and amplified by a base-emitter diode detection circuit 47. The fundamental frequency of the detected waveform is 60 cycles, and most of the high frequency noise is filtered out by a low pass filter following the detector-amplifier circuit 47. An RC-tuned 60-cycle bandpass amplifier receives this signal and rejects all noise with frequency components other than 60 cycles. The output of the tuned amplifier 56 is detected by a second amplitude detector 57 which provides an output waveform of the type shown at 58. The output of the detector is integrated in an integrator 59 which provides an output signal of the form shown at 61 to a current amplifier 62. The amplified output current is used to drive a silicon controlled rectifier which, in turn, activates various types of control or warning circuits.

It is seen that because of the unique characteristics of the signal, noise is strongly rejected by employing the first detector, low pass filter, and a narrow band amplifier, all operating at the frequency of power transmission.

Figure 10:
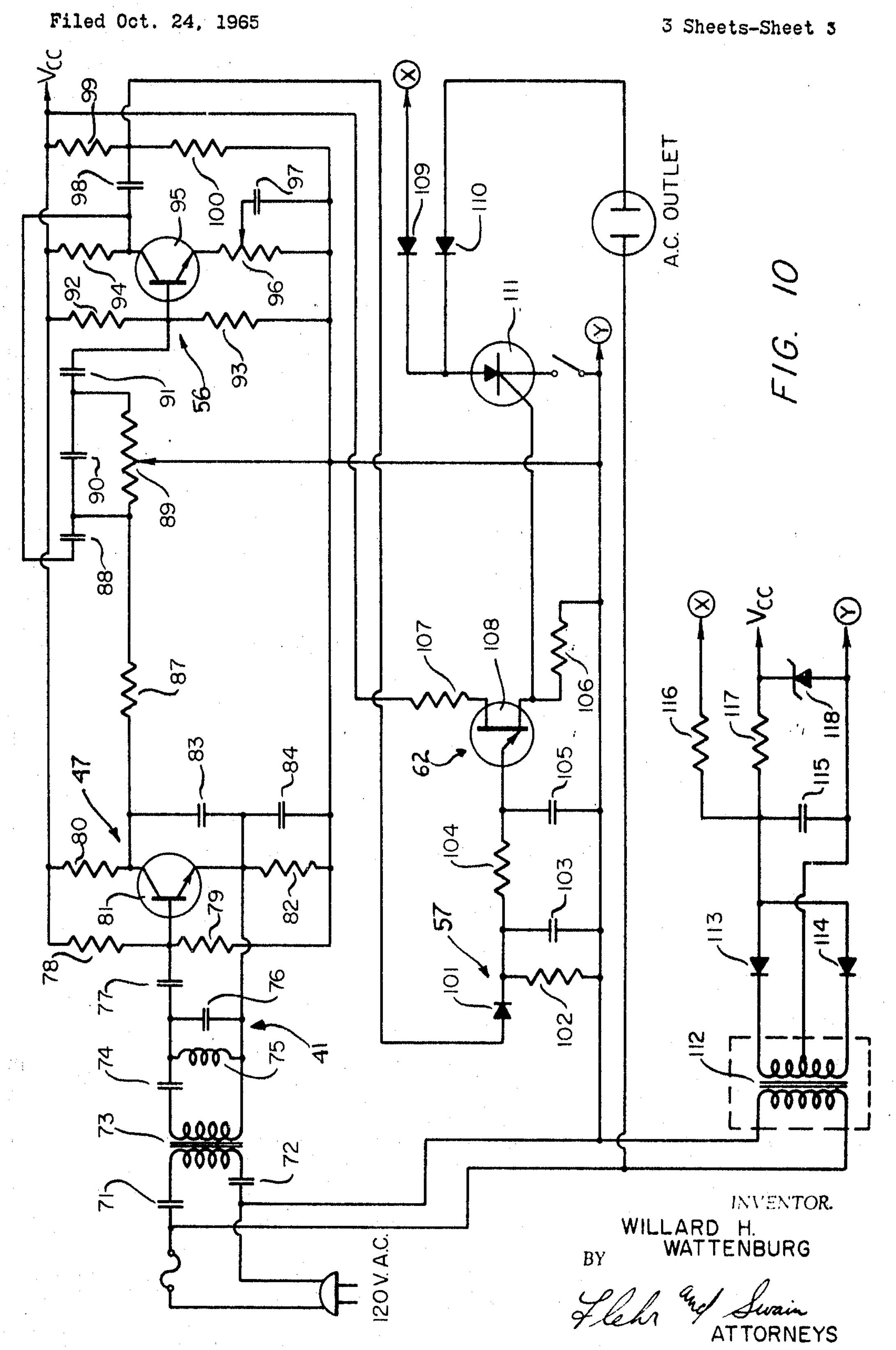
FIGURE 10 is a detailed circuit diagram of the receiving unit shown in FIGURE 9.

A complete circuit diagram of a typical receiving unit in accordance with the above is shown in FIGURE 10. The arows indicate generally the circuit components performing the functions described in the block diagram of FIGURE 9.

Transmitting and receiving circuits in accordance with the foregoing were constructed for operation in a 110 volt, 60 cycle power transmission circuit. The components were selected as set forth below, so that the signalling and receiving units operated at 17 kilocycles.

The values of the components, FIGURES 2 and 10, were as follows:

Resistors

| | Ohms | | Ohms |
|---|---|---|---|
| 24 | 1K | 89 | 20K |
| 25 | 1K | 92 | 100K |
| 30 | 1K | 93 | 10K |
| 31 | 22K | 94 | 4.7K |
| 33 | 22K | 96 | 1.5K |
| 35 | 4.7K | 99 | 47K |
| 36 | 15K | 100 | 100K |
| 38 | 1K | 102 | 100K |
| 78 | 330K | 104 | 100K |
| 79 | 33K | 107 | 200 |
| 80 | 8.2K | 106 | 27 |
| 82 | 4.7K | 116 | 4.7K |
| 87 | 10K | 117 | 1.5K |

Capacitors

| | Mf. | | Mf. |
|---|---|---|---|
| 23 | 0.047 | 84 | 100 |
| 32 | 0.0033 | 88 | 0.1 |
| 34 | 0.0033 | 90 | 0.15 |
| 37 | 0.01 | 91 | 0.15 |
| 71 | 0.15 | 97 | 100 |
| 72 | 0.15 | 98 | 10 |
| 74 | 0.003 | 103 | 1 |
| 76 | 0.033 | 105 | 10 |
| 77 | 0.003 | 115 | 500 |
| 83 | 0.33 | | |

Diodes

| | |
|---|---|
| 101 | 1N64 |
| 109 | 1N2071 |
| 110 | 1N2071 |
| 113 | 1N2071 |
| 114 | 1N2071 |
| 118 (Zener) | 1N4746 |

Transistors

| | |
|---|---|
| 26 (RCA) | 40256 |
| 28 | 2N3641 |
| 29 | 2N3641 |
| 81 | 2N3565 |
| 95 | 2N3565 |
| 108 | 2N2160 |

Silicon controlled rectifier

| | |
|---|---|
| 111 (GE) | C6B |

Coil and transformers

| | |
|---|---|
| 73 | Input transformer 24:4,000. |
| 75 | RF coil 1 mH. |
| 112 | Power transformer. |

Performance characteristics: The minimum signal voltage required on the line by the receiver was approximately 100 millivolts peak to peak or 35 millivolts RMS measured at the peak point of the 60 cycle envelopes. Compared to the amplitude of extraneous noise commonly present in house wires (which may be 100 volts or more), the signal voltage required is very small. The sending units produced signals of 10 volts or more on the line. Attenuation of the signal along the power line was approximately 3 db per 200 ft. But the attenuation characteristics were more or less dependent on the loading conditions of the particular power line. Reliable operation was effected over several thousand feet of power lines within structures. The system was not susceptible to any continuous wave noise of any frequency which may be generated on the line by such instruments as a wireless intercom. Test results showed that the system performed reliably with the existence of in-band noise 10 db above the signal produced by a sending unit.

The system described above employs a signalling unit which can be used in a conventional outlet of a home. The unit may be activated by a thermally sensitive device which serves to connect the multivibrator across the power line and, in turn, periodically draw power. Such communication paths exist in all modern construction and would require no extra lines for good coverage of the structure. Large numbers of sensors can be employed and their location changed at will by merely plugging in and out of the outlets.

I claim:

1. A signalling system for use with transmission lines of an AC power distribution system operating at a predetermined power line frequency comprising, a signalling unit including a sensing device having a switch and means for closing said switch in response to an external condition, a load, an oscillator circuit having a characteristic high frequency oscillation output when supplied with voltage above a predetermined level less than the power line voltage, an electronically controlled switch means having a control input connected to the output of said oscillator circuit, said switch means conducting in response to each oscillation applied to said input, means for connecting said oscillator in series with said sensing device across the power lines so that said oscillator is energized thereby on every alternate half cycle of the power line frequency, means connecting said electronically controlled switch in series with said load across said power lines so that said load is periodically connected across said line by said electrically controlled switch at said characteristic high frequency to thereby continuously periodically modulate said power lines by applying said load to the lines at said high frequency during a portion of every alternate half cycle of said power line frequency, a receiver coupled to said power lines, said receiver including a bandpass filter circuit tuned to said high frequency, a first detector connected to said filter circuit for delivering the envelope component thereof, an output circuit means connected to receive the output of said first detector and tuned to the power line frequency component for providing an indication whenever said envelope contains a component at the power line frequency.

2. A signalling system as in claim 1 wherein said oscillator is a multivibrator and wherein said electronically controlled switch means is a triggered semiconductor device.

3. A signalling system as in claim 1 wherein said receiver is connected to the transmission lines between the power absorbing unit and the source of power.

References Cited

UNITED STATES PATENTS

| | | | |
|---|---|---|---|
| 3,287,722 | 11/1966 | Craig | 340—310 |
| 2,206,702 | 7/1940 | La Pierre | 325—310 X |
| 2,587,213 | 2/1952 | Polin | 325—31 |
| 3,150,359 | 9/1964 | Hoey | 340—326 X |
| 3,188,623 | 6/1965 | Culbertson | 340—81 X |
| 3,283,316 | 11/1966 | Beardmore et al. | 340—310 |
| 1,660,930 | 2/1928 | MacDonald | 325—430 X |

OTHER REFERENCES

GE Transistor Manual, Sixth Ed., 1962, p. 75, FIG. 6.4.

THOMAS B. HARBECKER, Primary Examiner

C. M. MARMELSTEIN, Assistant Examiner

U.S. Cl. X.R.

307—116, 126, 140, 247, 296; 340—310